June 17, 1947.                M. J. DUER                2,422,343
                          SPEED CONTROL DEVICE
                          Filed June 14, 1943         4 Sheets-Sheet 1

Inventor

Morris J. Duer

By Bacon & Thomas

Attorneys

Inventor
Morris J. Duer
By Bacon & Thomas
Attorneys

Patented June 17, 1947

2,422,343

UNITED STATES PATENT OFFICE 2,422,343

SPEED CONTROL DEVICE

Morris J. Duer, Troy, Ohio

Application June 14, 1943, Serial No. 490,821

9 Claims. (Cl. 74—282)

1

This invention relates to a speed control device and more particularly to a device in which the speed of a shaft or other rotating member driven under high torque from a driving shaft or other rotating member may be accurately controlled by the employment of a very small amount of force or torque.

The invention is primarily concerned with devices in which a locking worm gear arrangement is employed, that is, a worm gear in which the teeth of the worm have a helix angle which is close to the friction angle and, in most cases the worm has a helix angle which is less than the friction angle so that the worm gear is incapable of driving the worm even under high torque. The invention finds utility in various environments such as variable speed device for machine tools having a constant speed prime mover, follow-up devices, clutches, brakes, combined clutches and brakes, etc. In any of these environments the speed of a shaft, which may be subjected to high torques, is accurately controlled by instrumentalities requiring a small fraction of the torque applied to the controlled shaft. This high torque may be furnished by any suitable type of prime mover operating a driving shaft or other rotatable element.

It is, therefore, an object of the present invention to provide an improved device for controlling the speed of a driven member operating under high torque by the employment of a small amount of torque.

Another object of the invention is to provide a variable speed device employing a locking worm arrangement.

Another object of the invention is to provide an improved follow-up mechanism involving speed control by a controlling member operating with slight torque to control a driven member operating under high torque.

Another object of the invention is to provide a variable speed device in which a driven member is rotated from a driving shaft under high torque conditions and the speed of the driven member is controlled by a low torque member independently of the speed of the driving member.

Another object of the invention is to provide a mechanical variable speed device in which a driven member is rendered independently of a driving member under control of the speed of

2 the driving member whereby the load on the driving member is released when the speed of the driving member drops below a predetermined amount.

Another object of the invention is to provide a variable speed device in which the speed of a driven member is maintained substantially constant irrespective of the load thereon and irrespective of the speed of the driving member.

A further object of the invention is to provide a variable speed device involving a combined clutch and brake in which operation of a single member reduces the effective gear ratio between the driven member and the driving member and at the same time applies a braking torque to the driven member.

A still further object of the invention is to provide an improved method of controlling the speed of a driven member in which a torque which is a small fraction of the torque to which the driven member is subjected may be utilized to control the speed of the driven member.

Other objects and advantages of the invention will appear in the following description of the preferred embodiments thereof, of which

Figure 1:
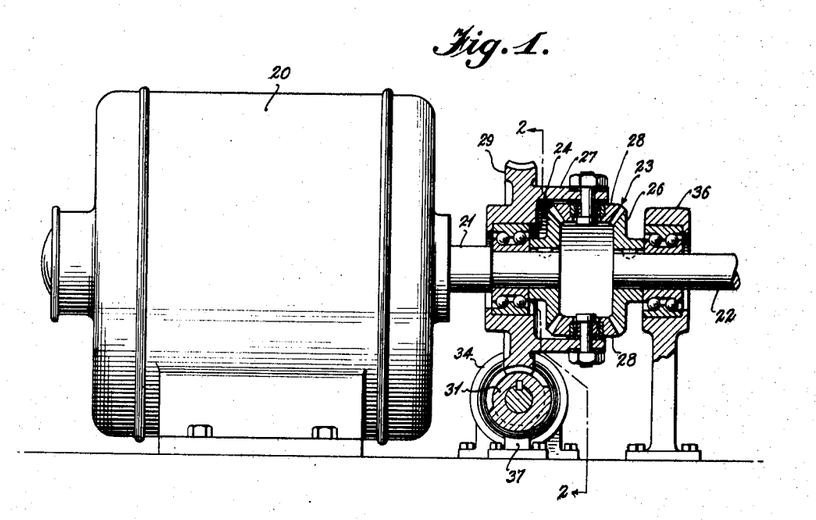
Fig. 1 is an elevation partly in section of a device in accordance with the present invention.
Figure 2:
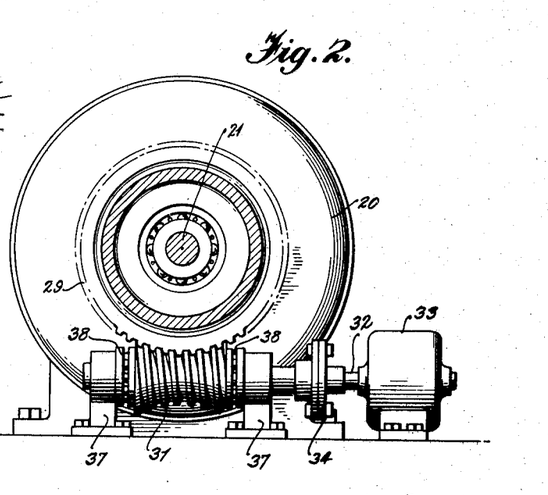
Fig. 2 is a substantially vertical section taken on the line 2—2 of Fig. 1.
Figure 3:
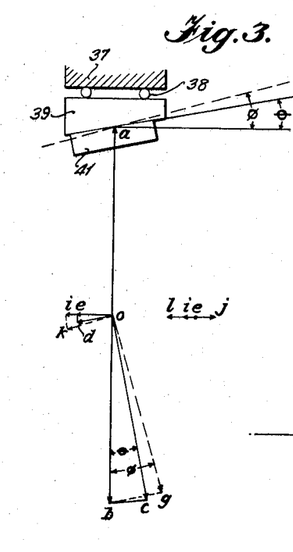
Fig. 3 is a vector diagram illustrating the operation of the worm gear arrangement of the present invention.

Referring to Figs. 1 to 3, one form of the device may include a prime mover shown as an electric motor 20, a driving shaft 21, and a driven shaft 22 connected to the driving shaft 21 through a conventional differential 23. The differential 23 may include a bevel gear 24 keyed to the driving shaft 21, a bevel gear 26 keyed to the driven shaft 22, and a pinion cage 27 carrying bevel pinions 28 meshing with the bevel gears 24 and 26. The pinion cage 27 may have mounted thereon or formed integrally therewith, a worm gear 29 meshing with a worm 31 connected to the shaft 32 of a small variable speed motor 33, or any other suitable variable speed source of power, through a shaft connector 34. The driven shaft 22 may be supported in any suitable bearing structure such as that shown at 36 and the worm 31 may be journaled in suitable bearing structure 37, preferably including ball thrust bearings 38 at each end of the worm.

Since the worm 31 has a sufficiently small helix angle that it cannot be driven by the worm gear 29, it will be apparent that the worm 31 and worm gear 29 will remain stationary unless the worm 31 is driven by the motor 33. It will be further apparent that when the worm gear 29 is stationary the driven shaft 22 will be rotated from the driving shaft 21 and its speed will be the same as that of the shaft 21, but in a reverse direction. If a load is placed on the shaft 22, a torque is developed in the differential 23 which tends to turn the worm gear 29. Even under high torque conditions on the worm gear 29 a slight force only is necessary to rotate the worm 31 in a direction enabling the worm gear 29 to turn in a direction which allows driven shaft 22 to reduce its speed. This principle is illustrated diagrammatically in Fig. 3 in which the member 39 represents one tooth of the worm 31, the member 41 represents a tooth of the worm gear 29 and the member 37 is the same as the bearing structure 37 in Fig. 2 providing a ball thrust bearing 38. The torque on the worm gear produces a force between the tooth 41 of the worm gear and the tooth 39 of the worm which is directed axially of the worm and which may be represented by the vector o—a. If the helix angle $\theta$ is less than the friction angle $\phi$, no movement of the element 39 to the left in Fig. 3 will take place no matter how great the force represented by the vector o—a. However, a very small force applied to 39 in a direction urging the same to the left in Fig. 3, will move the tooth 39 to the left (representing rotation of the worm) and allow the worm gear 41 to move upwardly (representing rotation of the worm gear).

This action is shown more clearly by a consideration of the remaining vectors of Fig. 3. Thus, vector o—b may represent the reaction of the worm tooth 39 against the worm gear tooth 41. This vector may be resolved into two components o—c and o—d, at right angles to each other, the vector o—d being parallel to the helix line of the teeth 39 and 41. The vector o—d has a component o—e perpendicular to the vector o—b and this vector o—b represents the force tending to cause movement of the worm tooth 39 to the left in Fig. 3. The vector o—b may also be resolved into two other components at right angles to each other, shown by the dotted vectors o—g and o—k, the vector o—g making an angle equal to the friction angle $\phi$ with respect to the vector o—b. The vector o—k has a component o—i, also perpendicular to the vector o—b, and the vector o—i represents the force which, exerted on the tooth 39, would just overcome the friction between the teeth 39 and 41 to move the tooth 39 to the left in Fig. 3. The difference between the vectors o—e and o—i, namely, e—i, is the force which must be supplied by the motor 33 to overcome the friction between the worm and worm gear if the helix angle is smaller than the friction angle. As shown to the left of the main vector diagram in Fig. 3, there is also a further friction force represented by the vector e—j which is the friction in the bearings 37 and ball thrust bearings 38. By adding the vector i—l, representing the force necessary to overcome this friction, to the vector e—i, the total force which must be furnished by the motor 33 is represented by vector e—l and this vector may be made a very small fraction of the force represented by the vector o—a. Thus, a very small force or torque furnished by the motor 33 is capable of controlling large torques on the worm gear 29. The spaced relation equations of the various parts of the device in Figs. 1 and 2 are elementary, but are useful in explaining the operation of some of the more complicated devices of the present invention and are given to show the relation between the device of Figs. 1 and 2 and the other structures shown in the drawings. Thus, the fundamental equation of the differential is:

$$\frac{R_B}{R_A} = \frac{S_A - S_C}{S_C - S_B} = K \text{ or } S_B = \frac{S_C(K+1) - S_A}{K}$$

Where $R_A$ is the radius of the gear attached to a main shaft A of the differential such as the driving shaft 21 of Figs. 1 and 2;
$R_B$ is the radius of the gear attached to the other main shaft B such as the driven shaft 22 of Figs. 1 and 2;
$S_A$ is the speed of shaft A;
$S_B$ is the speed of the shaft B;
$S_C$ is the speed of the pinion cage or spider; and
$K$ is the differential constant.

Also, $$S_W = K_W S_C$$

Where $S_W$ = the speed of the worm W; and
$K_W$ = the gear ratio of the worm and worm wheel Then $$S_B = \frac{S_W(K+1)}{KK_W} - \frac{S_A}{K}$$

In the differential shown in Figs. 1 and 2

$$K = 1$$

and $$S_B = \frac{2S_W}{K_W} - S_A$$

If $$S_W = 0$$

$$S_B = S_A$$

If $$S_W = \frac{K_W S_A}{2}$$

$$S_B = 0$$

As shown in the last two relations, if the speed $S_W$ of the worm 31 of Figs. 1 and 2 is made equal to zero, the speed of the driven shaft 22 is equal to the speed of the driving shaft 21 but is in the reverse direction. If the speed of the worm is made equal to $$\frac{K_W S_A}{2}$$

then $S_B$ the speed of the driven shaft is equal to zero. The worm may, of course, have any speed intermediate zero and its value which makes the value of the speed of the driven shaft zero, so that varying the speed of the worm varies the speed of the driven shaft between these extremes. The speed of the worm cannot, however, exceed that which makes the speed of the driven shaft zero, as the motor 33 is incapable of driving the worm gear 29 to reverse the direction of rotation of the driven shaft but may merely rotate the worm 31 at sufficient speed to enable the worm gear 29 to rotate and reduce the speed of the driven shaft.

Figure 4:
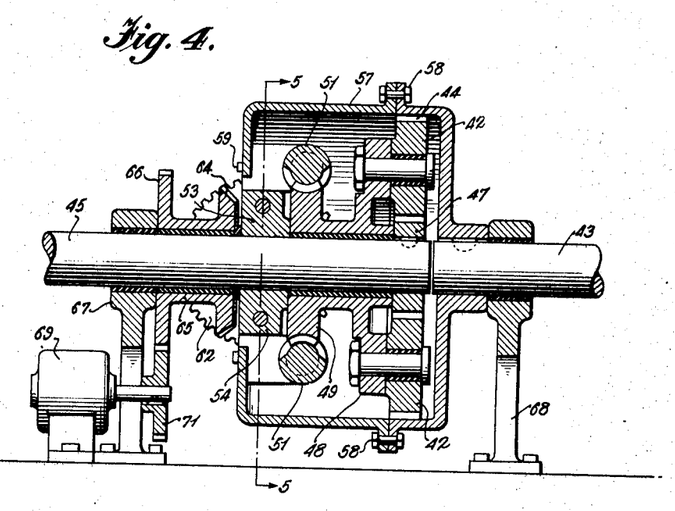
Fig. 4 is a vertical section through a modified device in accordance with the present invention taken on the line 4—4 of Fig. 5.
Figure 5:
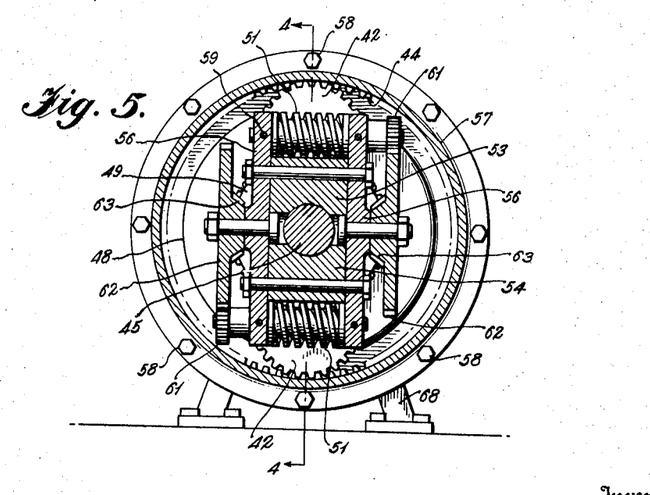
Fig. 5 is a vertical section taken on the line 5—5 of Fig. 4.

In the device of Figs. 1 and 2 the pinions 28 in the differential 23 are always rotating even when the speed of the driven shaft 22 is equal to the speed of the driving shaft 21. In Figs. 4 and 5 is illustrated a device in which the speed of the differential pinions 42 is zero when the speed of the driven shaft equals the speed of the driving shaft, i. e. when there is a direct drive through the device. Furthermore, in the device of Figs. 4 and 5 the driving and driven shafts always rotate in the same direction and none of the meshing gears subjected to power torques rotates with respect to a meshing gear under conditions of direct drive through the device.

The device in Figs. 4 and 5 includes a driving shaft 43 to which is secured an internal differential gear 44 meshing with the differential pinions 42. The driven shaft 45 carries a spur gear 47 keyed thereto which also meshes with the differential pinions 42 and the differential pinions 42 are carried by a cage or spider 48 journaled on the driven shaft 45. The pinion cage 48 also carries a worm gear 49 meshing with a pair of worms 51 journaled in a worm carrier 53. The worm carrier 53 is journaled upon the driven shaft 45 and includes a central member 54 provided with side plates 56 in which the worms 51 are journaled. The worm carrier 53 is connected to the driving shaft 43 by means of a shell 57 secured to the internal gear 44 by bolts 58 and to the worm carrier by bolts 59. Thus, the worm carrier 53 is constrained to rotate with the driving shaft 43.

The worms 51 have pinions 61 secured thereto which mesh with pinion driving gears 62 rotatably secured to the side plates 56 of the worm carrier 53. The pinion driving gears 62, are provided with concentric bevel gears 63. The bevel gears 63 mesh with a bevel gear 64 (Fig. 4) carried by a worm control member 65, also carrying a spur gear 66, the worm control member 65 being journaled upon the driven shaft 45. The driven shaft 45 may be journaled in a suitable bearing structure 67 and the driving shaft 43 may be journaled in the bearing structure 68. As shown in Fig. 4, the worm control member 65 may have its speed regulated by a small motor 69 or other mechanism through a gear 71 meshing with the gear 66.

The operation of the device of Figs. 4 and 5 can best be described in terms of equations. The fundamental equation of the differential given above may be rewritten as follows:

$$S_A = S_C(K+1) - K S_B$$

Where $S_A$ is the speed of the driven shaft 45, $S_B$ is the speed of the driving shaft 43 and is the speed of the pinion cage 48.

Since the driving shaft 43 is directly connected to the worm carrier $$S_C = S_B - \frac{S_W}{K_W}$$

Also, $$S_W = K_1 (S_B - S_D)$$

Where $S_D$ is the speed of the worm control member 6 and $K_1$ is the gear ratio between the worm cont member and the worm pinions.

Solving these three equations for $S_A$ in t terms of $S_B$ and $S_D$;

$$S_A = S_B \left( \frac{K_W - K K_1 - K_1}{K_W} \right) + S_D \left( \frac{K K_1 + K_1}{K_W} \right)$$

By making $$K_W - K K_1 - K_1 = 0$$

$$\frac{K K_1 + K_1}{K_W} = 1$$

and $$S_A = S_D$$

Many possible values of the various gear rati satisfy the last three relations, for example $$K = 3, \ K_W = 32 \text{ and } K_1 = 8$$

or $$K = 4, \ K_W = 40 \text{ and } K_1 = 8$$

If the conditions just specified are satisfie it will thus be seen that the speed of the driv shaft 45 is entirely controlled by the speed of t motor 69 although it is driven from the shaft ₄ the motor 69 furnishing none of the power f driving the shaft 45. If the worm has a small helix angle than the friction angle, the wor control member 65 rotates at the speed of t driven shaft 43 unless force is applied to preve its rotation thus causing the driven shaft 45 rotate at the same speed and produce a one one driving ratio through the device. Und these conditions the worm control member tends to drive the motor 69 and the motor may, therefore, be operated as a generator wi a resistance load. The amount of resistance the external circuit of the motor 69 determin its speed and, therefore, the speed of the shaft In the particular embodiment of Fig. 4, it preferable to make the helix angle of the wor 51 somewhat greater than the friction angle, b close to the friction angle, so that the worm 51 rotated by the worm gear 49, in which case t] worm control member 65 tends to remain at ze speed to hold the driven shaft 45 at zero spee The worm control member, however, has no ten ency to reverse its direction of rotation. It w be apparent from Fig. 3 that if the helix angle is made slightly greater than the friction angle the vect r representing the difference betwen t] vectors $o$—$i$ and $o$—$e$ will be reversed and m: be made just sufficiently large to overcome t] force due to bearing friction represented by t] vector $i$—$l$ and supply a small amount of for to rotate the worm W. The motor 69 then mere has to overcome this residual force tending rotate the worm, which may be made very sma and the motor 69 may be operated as a variab speed motor controlling the speed of the wor control member 65 and therefore the speed of t] worm. When no power is applied to the mot 69, the driven shaft 45 remains stationary. Suj plying power to the motor 69 drives the worm control member 65 and the driven shaft 45 will be rotated at the same speed as the worm control member 65 but is driven from the driving shaft 43. When the speed of the motor 69 is sufficient to drive the worm control member 65 at the speed of the driving shaft 43 there is again a one to one ratio or straight through drive between the driving shaft 43 and the driven shaft 45. Under this condition there is no relative rotation between any of the gears carrying power torque. The motor 69 is not sufficiently large to drive the worm control member 65 at a greater speed than the speed of the driving shaft 43 and furnishes no power to driven shaft 45.

Figure 6:
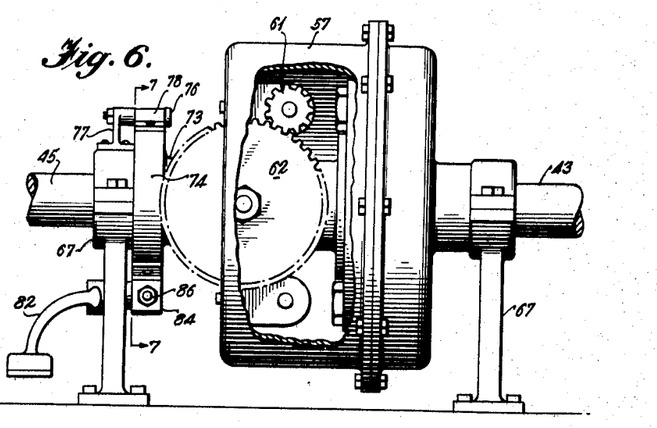
Fig. 6 is an elevation of a further modified device with parts partly broken away to show certain of the details also employed in Figs. 4 and 5.
Figure 7:
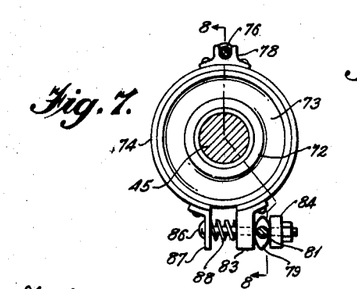
Fig. 7 is a fragmentary vertical section taken on the line 7—7 of Fig. 6.
Figure 8:
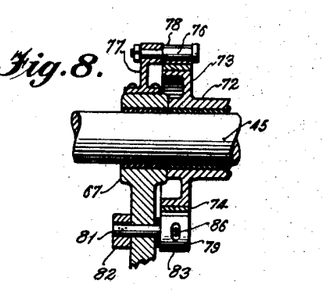
Fig. 8 is a fragmentary vertical section taken on the line 8—8 of Fig. 7.

Since the speed of the worm control member is the same as and sets the speed of the driven shaft 45, if the helix angle of the worm is made slightly less than the friction angle, the worm control member designated 72 in Fig. 8, which is the same as the worm control member 65 of Fig. 4 except that it is provided with a brake drum 73 instead of a gear, may be controlled by the action of a friction brake band 74, such as shown in Figs. 6 to 8 inclusive, or other form of brake. The brake band 74 may be held in position and prevented from rotating by a stud 76 positioned in a bracket 77 secured to the bearing structure 67 and engaging in a slotted bracket 78 secured to the brake band 74. The brake band 74 may be engaged with the brake drum 73 by means of a cam 79 on an operating shaft 81 journaled in the standard of the bearing structure 67 and may be provided with a pedal or operating lever 82. The cam 79 may engage between bracket 83 secured to one end of the brake band 74 and against a cam follower member 84 secured to a rod 86 extending through the bracket 83 and another bracket 87 attached to the other end of the brake band 74. A spring 88 positioned between the brackets 83 and 87 may release the brake band from the brake drum 74 and return the operating lever 82 to its non-operative position.

Since the worm control member 72 tends to rotate at the same speed as the driving shaft 43, when the brake is in its released position the driven shaft 45 is driven from the driving shaft 43 at the same speed as the driving shaft 43 under this condition of operation. Applying the brake reduces the speed of the worm control member 72 and, therefore, reduces the speed of the driven shaft 45. Since the driven shaft 45 is constrained to rotate at the same speed as the worm control member 72, operation of the brake to apply the same to stop the worm control member 72, not only acts as a clutch to release the driven shaft 45 from the driving shaft 43, but also acts as a brake to positively stop the driven shaft 45. The device of Figs. 6 to 8, therefore, functions as a combined clutch and brake wherein the brake operates in synchronism with the clutch to brake the driven shaft to the same extent it is released from the driving shaft 43.

Figure 9:
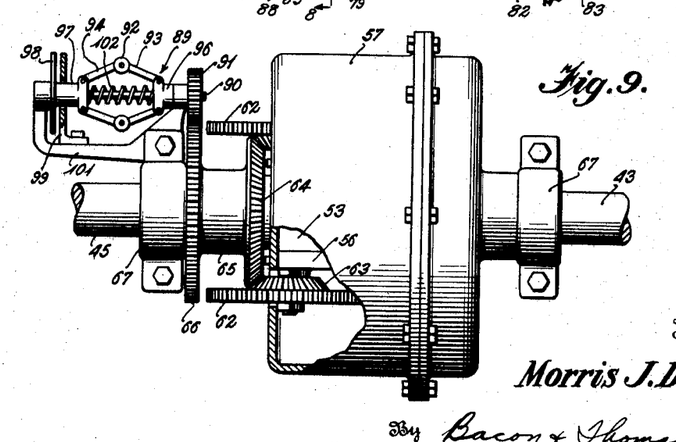
Fig. 9 is a plan view of a modified form of device with parts broken away illustrating certain details also employed in Figs. 4, 5 and 6.

Referring to Fig. 9, it will be apparent that the worm control member 65 of this figure, which may be identical with the worm control member 65 of Fig. 4, may have its speed controlled by a speed sensitive device such as a governor 89 driven from the worm control member 65 through the gear 66 thereon meshing with a gear 91 on governor shaft 90. The governor 89 may be of any suitable form such as the conventional ball type including the weights 92 and links 93 and 94 pivoted at one of their ends to the weights 92. The links 93 may have their other end pivoted to a member 96 fast on the governor shaft 90 and the links 94 may have their other ends pivoted to a member 97 splined for axial movement upon the shaft 90. The splined member 97 may also carry a friction member 98 secured thereto and arranged to engage a stationary friction member 99 adjustably secured to a bracket 101 carrying the governor 89 and secured to the bearing structure 67. The friction member 98 may be maintained spaced from the friction member 99 under zero or low speed conditions by a spring 102 between the governor members 96 and 97. It will be apparent that at low speeds the governor will run freely and that at a predetermined speed, determined by the spring 102 and the position of the friction member 99, the friction member 98 will engage the friction member 99 to resist further increase of speed of the governor and therefore the worm control member 65. The driven shaft 45 will, therefore, have its upper speed set by the governor 89 irrespective of the speed of the driving shaft 43 and substantially independently of the load on the driven shaft 45. This speed may be adjusted by adjusting the position of the friction member 99. Thus, if the speed of the drive shaft 43 is always at least as high as the desired speed of the driving shaft 43, the driven shaft 45 may be maintained at substantially constant speed by the governor 89.

Figure 10:
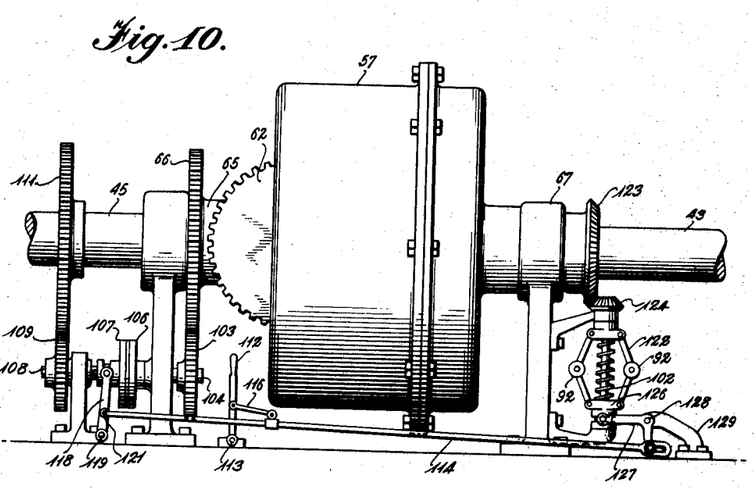
Fig. 10 is an elevation of a further modified device.

In the devices of Figs. 4 to 9, inclusive, the speed of the worm control member 72 determines the speed of the driven shaft 45. As shown in Fig. 10, connecting the worm control member 72 directly to the driven shaft 45 so as to rotate it at the same speed as the driven shaft 45, causes the driven shaft 45 to become entirely independent of the driving shaft 43 so that either the driven shaft 45 or the driving shaft 43 may be rotated independently of each other without affecting the other. Thus, the worm control member 65 may be connected to the driven shaft 45 through a gear 103 meshing with the gear 66 on the clutch control member 65 and secured to a shaft 104. The shaft 104 may have a friction clutch element 106 connected to its other end. Another friction clutch element 107 arranged to be engaged or disengaged with the friction clutch element 106 may be splined on a shaft 108 carrying a gear 109 meshing with a gear 111 secured to the driven shaft 45. If the gear ratio between the gears 111 and 109 is the same as that between the gears 66 and 103, engaging the clutch elements 106 and 107 will cause the worm control member 65 to rotate at the same speed as driven shaft 43.

There is one anomalous condition in the mechanism shown in Fig. 10. The condition for direct drive from shaft 43 to shaft 45, namely, that the worm control member 65 rotate at the same speed as the driving shaft 43 and therefore at the same speed as the driven shaft 45 is the same as the condition at which the driven shaft 45 is independent of the driving shaft 43, namely that the speed of the clutch control member 65 is the same as that of the driven shaft 45. This anomaly may be overcome by making the gear ratios between the gears 111 and 109 with respect to the gear ratio of the gears 66 and 103 such that the worm control 65 tends to be driven at a slightly less speed than the shaft 45 when the clutch members 106 and 107 are engaged. Thus, when the clutch members 106 and 107 are disengaged, worm control member 65 rotates at the same speed as driving shaft 43 and as the worm gear 49 of Fig. 4 cannot drive the worm 51, the driven shaft 45 is locked to the driving shaft 43. When the clutch members 106 and 107 are engaged the worm control member 65 tends to be driven at a slightly less speed than that of the shaft 45 or the shaft 43 so that the worm is rotated in the correct direction to cause the driven shaft to reduce its speed. Except for a short period of time necessary to take up any back lash in the various gears, the worm control member 65 cannot be driven from the shaft 45 at a lower speed than the shaft 45, since the mechanism requires that the speed of the driven shaft 45 be the same as that of the worm control member 65. A slight amount of slippage occurs between the friction members 106 and 107, but this slippage decreases as the speed of the shaft 45 decreases and becomes zero when the speed of the shaft 45 becomes zero.

The engagement and disengagement of the clutch member 107 with the clutch member 106 may be accomplished in any desired manner, for example by means of a hand lever 112 pivoted at 113 and connected to a clutch operating rod 114 by a link 116 pivoted to the lever 112 and the operating rod 114. The clutch member 117 may be provided with a clutch shifting fork which may take the form of a lever 118 pivoted at 119 and pivotally connected to the clutch operating rod 114 at 121. Movement of lever 112 to the left in Fig. 10 disengages clutch member 106 from clutch member 107 thereby allowing worm control member 65 to rotate at the same speed as the driving shaft 43 causing the driven shaft 45 to also rotate at this speed. Movement of the clutch control member 112 to the right in Fig. 10 engages the clutch members 106 and 107, releasing driven shaft 45 from driving shaft 43.

The clutch member 107 may, of course, be actuated by any other suitable means, for example a governor 122 driven by the driving shaft 43 through a bevel gear 123 keyed to the shaft 43 and a bevel gear 124 on the governor shaft. The governor 122 may be of any suitable type and may be similar to the governor 89 of Fig. 9. The governor may include an axially movable member 126 splined on the governor shaft so as to be engaged by a fork member 127 in the form of a bell crank pivoted at its center portion at 128 to a stationary bracket 129. The other arm of the bell crank 127 may be pivoted to the clutch operating rod 114 so that at a predetermined speed of the governor set by the strength of the spring 102 relative to the mass of the weights 92, the arm of the bell crank 127 engaging the slidable member 126 of the governor is rotated in a clockwise direction in Fig. 10 to release the clutch member 107 from the clutch member 106.

Thus, at a predetermined speed of the driving shaft 43 the worm control member 65 is released from the driven shaft 45 so that the driven shaft 43 tends to be connected to the driving shaft 45 with a one to one ratio. As the speed falls below a predetermined amount the clutch member 107 is engaged with the clutch member 106 to release driven shaft 45 from driving shaft 43. The device of Fig. 10 thus becomes a clutch under control of speed of the driving shaft so that the speed of the driving shaft determines the connection of the driving shaft to the driven shaft. Such an arrangement can be employed in automobiles, for example, in which at idling speeds the driving shaft is disconnected from the driven shaft and as the speed of the motor is increased the motor picks up and drives the driven shaft. In all of the devices of Figs. 4 to 10, the inertia of the parts such as the worm 51, worm carrier 59, gears 62, worm control member 65, etc., is such as to resist abrupt changing of the speed of the driven shaft 45 and smooth engagement, for example of the connection between the driving shaft and the driven shaft (in Fig. 10) is accomplished even though the clutch member 107 is abruptly released from clutch member 106.

It will be appreciated that in all of the devices in Figs. 4 to 10 the driven shaft 45 follows the rotation of the worm control member 65 so that these devices are in fact follow-up devices requiring a small amount of torque to control a large amount of torque. The follow-up action, however, in the device of Figs. 4 to 10 is uni-directional only, that is to say the driven shaft 45 can be stopped or brought up to the speed of the driving shaft in one direction only but the driving shaft 45 cannot be reversed without reversing the driven shaft 43. Furthermore, with a given direction of the driving shaft 43 the worm control member 65 cannot be rotated in a direction reverse to that of the driving shaft 43 by the small torque refered to.

Figure 11:
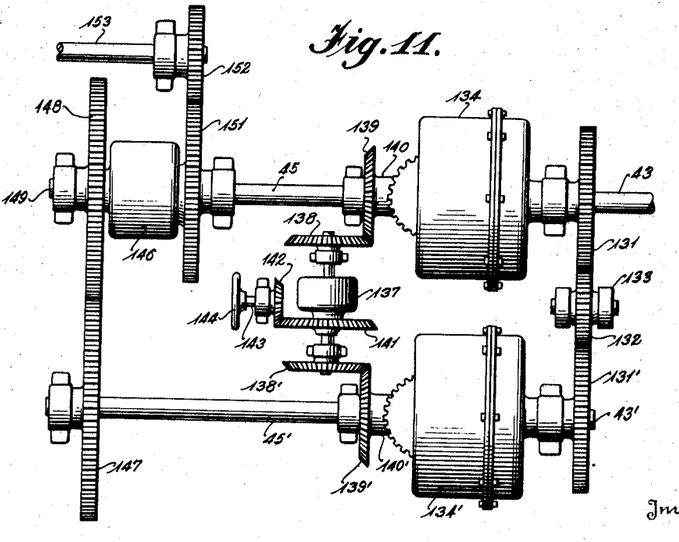
Fig. 11 is a still further modified device illustrating a two directional follow-up system.

A follow-up device which operates in either direction may, however, be provided by employing two of the devices of Fig. 4. Thus, as shown in Fig. 11, a driving shaft 43 may be suitably geared to another driving shaft 43' so as to rotate the shafts 43 and 43' in the same direction. A possible arrangement for doing this is to key a gear 131 to the driving shaft 45 and a gear 131' to the driving shaft 43'. The gear 131 may drive the gear 131' through an idler pinion 132 supported in a suitable bearing structure 133. The worm control members 65 and 65' of the variable speed devices 134 and 134', respectively, may be controlled from a conventional bevel gear differential 137 through bevel gears 138 and 138' secured to the bevel gears (not shown) of differential 137 and meshing with bevel gears 139 and 139', respectively, secured to the worm control members 140 and 140', respectively. A bevel gear 141 carried by the pinion cage of the differential 137 may mesh with a bevel gear 142 on a control shaft 143 arranged to be rotated by any suitable member such as a hand wheel 144. The driven shaft 45 from the variable speed device 134 may be keyed to one of the bevel gears (not shown) of the conventional bevel gear differential 146 while the driven shaft 45' of the variable speed device 136 may drive the other bevel gear (not shown) of the differential 146 through a gear 147 fast on the shaft 45' and meshing with the gear 148 on a shaft 149 carrying the other bevel gear (not shown) of the differential 146. A gear 151 carried by the pinion cage of the differential 146 may mesh with a gear 152 fast on a shaft 153. The shaft 153 is the follower shaft following the motion of the control shaft 143.

From the known action of differentials such as the differential 137 the worm control member 140 of the variable speed device 134 and the worm control 140' of the variable speed device 134' can rotate at the same speed without causing any rotation of the pinion cage of the differential 137 or the gear 141 attached thereto, since rotation of the worm control devices 140 and 140' in the same direction causes opposite rotation of the bevel gears of the differential 137. Thus, the worm control members 140 and 140' may rotate freely and under these conditions will be rotated at the same speeds as the driving shafts 43 and 43', respectively. Also under these conditions the driven shafts 45 and 45' rotate at the same speed as the driven shafts 43 and 43' and since these shafts are connected to the opposite bevel gears in the differential 146 and operate these bevel gears in opposite directions, no rotation of the gear 151 connected to the pinion cage of the differential 146 takes place. Thus, the shaft 153 remains stationary. Upon rotation of control shaft 143 one of the worm control members 140 or 140' will be rotated at a lower speed than the other due to the differential action in the differential 137. Thus, one of these members will be rotated at a lower speed than its corresponding driving shaft 43 or 43' causing the corresponding driven shaft 45 or 45' to be rotated at the lower speed. This causes a differential action in the differential 146 to drive the pinion cage gear 151 thereof and, therefore, the follow-up shaft 153.

Since neither of the worm control members 140 nor 140' can be driven faster than their respective driving shafts 43 or 43', the result of turning the control shaft 143 is always to lower the speed of one of the worm control members 140 or 140'. The control shaft 143 tends to remain stationary or can be rotated in either direction with a small torque and the follow-up shaft 153 will accurately follow the control shaft 143 at any torque necessary to carry the load imposed upon the shaft 153, the accuracy of the follow-up device being limited only by the precision with which the various gears in the organization can be finished. No lost motion except that due to back lash or clearance in the gears, takes place between the control shaft 143 and the follow-up shaft 153.

While the follow-up system of Fig. 11 has been developed by reference to the type of variable speed mechanism shown in Figs. 4 and 5 it should be apparent that the simpler type of variable speed mechanism shown in Fig. 1 can be substituted in toto for the variable speed mechanisms 134 and 134' of Fig. 11. The worm 31 of each variable speed device can be connected directly to the bevel gears of the differential 137 of Fig. 11 or through any suitable gearing. The driven shaft 22 of Fig. 1 of each of the variable speed mechanisms would then constitute the driving shafts 45 and 45' of Fig. 11. As will be apparent, the gear ratios between the follower shaft 153 and the driven shafts or between the control shaft 143 and the variable speed devices would, however, have to be varied from that shown if a one to one speed ratio between the control shaft and follower shaft is maintained.

In the follow-up devices just described, advantage is taken of the operation of a worm where the helix angle is slightly less than the friction angle in order to prevent substantial reaction of a shaft operating under high torque condition back upon a shaft which can be operated by low torque. A helix angle slightly greater than the friction angle was utilized in Fig. 4. The present invention is, therefore, concerned with the utilization of the advantages which can be obtained by employing a worm and worm gear assembly in which the helix angle of the worm is close to the friction angle. The friction angle referred to in each case is the kinetic friction angle rather than the static friction angle the static friction angle always being somewhat greater than the kinetic friction angle. In any mechanism requiring starting of the worm from zero speed relative to the worm gear, the control torque must, of course, be sufficient to overcome static friction as well as kinetic friction.

While I have disclosed the preferred embodiments of my invention, it is understood that the details thereof may be varied within the scope of the following claims.

I claim:

1. In a speed control device, a differential device including two differential gear members, a rotatable pinion supporting member and a differential pinion journalled in said pinion supporting member and meshing with said gear members, a driving element rotating one of said members, a driven element rotated by another of said members, a rotatable worm gear rotated by another of said members, a worm supporting member journalled for rotation about the axis of said worm gear, a worm journalled in said worm supporting member and meshing with the teeth of said worm gear, said worm supporting member being rotated by one of said elements, a control element journalled for rotation about said axis independently of any of said members for controlling the rotation of said worm relative to said worm gear for varying the relative speed of said driving and driven elements, said worm having a helix angle substantially equal to the friction angle between the contacting surface of said worm and the teeth of said worm gear, whereby a relatively small amount of power applied to said control element is effective to control the speed of said driven element when said driving element is transmitting a relatively large amount of power to said driven element, and control means for controlling the rotation of said control element, said control means having insufficient power to supply power torque to said driven element.

2. In a variable speed device, a differential device including two differential gear members, a rotatable pinion supporting member and a differential pinion journalled in said pinion supporting member and meshing with said gear members, said members being journalled for rotation about a common axis, a driving element rotating one of said members, a driven element rotated by another of said members, a worm gear journalled for rotation about said axis and rotated by another of said members, a worm supporting member journalled for rotation about said axis, a worm journalled in said worm supporting member and meshing with the teeth of said worm gear said worm supporting member being rotated by one of said elements, a control element journalled for rotation about said axis independently of any of said members for rotating said worm relative to said worm gear for varying the relative speed of said driving and driven members, said worm having a helix angle substantially equal to the friction angle between the contacting surface of said worm and the teeth of said worm gear, whereby a relatively small amount of power applied to said control element is effective to control the speed of said driven element when said driving element is transmitting a relatively large amount of power to said driven element, and control means for controlling the rotation of said control element, said control means having insufficient power to supply power torque to said driven element.

3. In a speed control device, a differential device including two differential gear members, a rotatable pinion supporting member and a differential pinion journalled in said pinion supporting member and meshing with said gear members, a driving element rotating one of said members, a driven element rotated by another of said members, a rotatable worm gear rotated teeth of said worm gear, said worm supporting member being rotated by one of said elements, a control element journaled for rotation about said axis, gearing between said worm and control element for rotating said worm relative to said worm gear upon relative rotation between said worm supporting member and said control element whereby varying the speed of rotation of said control element varies the speed of said driven element relative to said driving element, said gearing having a gear ratio correlated with the gear ratios of said differential device and of said worm and worm gear to cause said driven element to have the same speed of rotation as said control element, said worm having a helix angle substantially equal to but slightly less than the friction angle between said worm and the teeth of said worm gear, and braking means for controlling the speed of said control element.

9. In a speed control device, a differential device including two differential gear members, a rotatable pinion supporting member and a differential pinion journalled in said pinion supporting member and meshing with said gear members, a driving element rotating one of said members, a driven element rotated by another of said members, a rotatable worm gear rotated by another of said members, a worm supporting member journalled for rotation about the axis of said worm gear, a worm journalled in said worm supporting member and meshing with the teeth of said worm gear, said worm supporting member being rotated by one of said elements, a control element journalled for rotation about said axis, gearing between said worm and control element for rotating said worm relative to said worm gear upon relative rotation between said worm supporting member and said control element whereby varying the speed of rotation of said control element varies the speed of said driven element relative to said driving element, said gearing having a gear ratio correlated with the gear ratios of said differential device and of said worm and worm gear to cause said driven element to have the same speed of rotation as said control element, said worm having a helix angle substantially equal to but slightly less than the friction angle between said worm and the teeth of said worm gear, and means responsive to the speed of said driving element to connect said control element to said driven element to rotate at the same speed as said driven element when the speed of said driving element is below a predetermined speed and to cause said control element to rotate at the same speed as said driving element when the speed of said driving element is above said predetermined speed.

MORRIS J. DUER.

REFERENCES CITED

The following references are of record in the file of this patent:

UNITED STATES PATENTS

| Number | Name | Date |
| --- | --- | --- |
| 1,263,125 | Sawyer | Apr. 16, 1918 |
| 1,265,329 | Henderson | May 7, 1918 |
| 1,782,001 | Crichton | Nov. 18, 1930 |
| 2,259,823 | Locke | Oct. 21, 1941 |
| 1,594,396 | Weston | Aug. 3, 1926 |
| 1,708,270 | Henderson | Apr. 9, 1929 |
| 1,909,792 | Weston | May 16, 1933 |
| 1,909,801 | Basart | May 16, 1933 |
| 1,132,603 | Myers | Mar. 23, 1915 |
| 1,589,379 | Fanberg | June 22, 1926 |
| 2,129,138 | Rlema | Sept. 6, 1938 |
| 1,310,976 | Williams | July 22, 1919 |
| 2,022,141 | Morgan | Nov. 26, 1935 |
| 1,723,231 | Ellsworth | Aug. 6, 1929 |
| 1,745,086 | Ellsworth | Jan. 28, 1930 |

FOREIGN PATENTS

| Number | Country | Date |
| --- | --- | --- |
| 243,849 | Great Britain | Dec. 10, 1925 |
| 272,206 | Great Britain | May 30, 1927 | by another of said members, a worm supporting member journalled for rotation about the axis of said worm gear, a worm journalled in said worm supporting member and meshing with the teeth of said worm gear, said worm supporting member being rotated by one of said elements, a control element journalled for rotation about said axis independently of any of said members, gearing between said worm and control element for rotating said worm relative to said worm gear upon relative rotation between said worm supporting member and said control element whereby varying the speed of rotation of said control element varies the speed of said driven element relative to said driving element.

4. In a speed control device, a differential device including two differential gear members, a rotatable pinion supporting member and a differential pinion journalled in said pinion supporting member and meshing with said gear members, a driving element rotating one of said members, a driven element rotated by another of said members, a rotatable worm gear rotated by another of said members, a worm supporting member journalled for rotation about the axis of said said worm gear, a worm journalled in said worm supporting member and meshing with the teeth of said worm gear, said worm supporting member being rotated by one of said elements, a control element journalled for rotation about said axis independently of any of said members, gearing between said worm and control element for rotating said worm relative to said worm gear upon relative rotation between said worm supporting member and said control element whereby varying the speed of rotation of said control element varies the speed of said driven element relative to said driving element, said gearing having a gear ratio correlated with the gear ratios of said differential device and of said worm and worm gear to produce zero rotation of said driven element when said control element has zero rotation and to produce a 1 to 1 gear ratio between said driven element and driving element when said control element rotates at the same speed as the worm supporting element.

5. In a speed control device, a differential device including two differential gear members, a rotatable pinion supporting member and a differential pinion journalled in said pinion supporting member and meshing with said gear members, a driving element rotating one of said members, a driven element rotated by another of said members, a rotatable worm gear rotated by another of said members, a worm supporting member journalled for rotation about the axis of said worm gear, a worm journalled in said worm supporting member and meshing with the teeth of said worm gear, said worm supporting member being rotated by one of said elements, a control element journalled for rotation about said axis independently of any of said members, gearing between said worm and control element for rotating said worm relative to said worm gear upon relative rotation between said worm supporting member and said control element whereby varying the speed of rotation of said control element varies the speed of said driven element relative to said driving element, said gearing having a gear ratio correlated with the gear ratios of said differential device and of said worm and worm gear, to cause said driven element to have the same speed of rotation as said control element.

6. In a speed control device, a differential device including two differential gear members, a rotatable pinion supporting member and a differential pinion journalled in said pinion supporting member and meshing with said gear members, a driving element rotating one of said members, a driven element rotated by another of said members, a rotatable worm gear rotated by another of said members, a worm supporting member journalled for rotation about the axis of said worm gear, a worm journalled in said worm supporting member and meshing with the teeth of said worm gear, said worm supporting member being rotated by one of said elements, a control element journalled for rotation about said axis, gearing between said worm and control element for rotating said worm relative to said worm gear upon relative rotation between said worm supporting member and said control element whereby varying the speed of rotation of said control element varies the speed of said driven element relative to said driving element, said gearing having a gear ratio correlated with the gear ratios of said differential device and of said worm and worm gear to cause said driven element to have the same speed of rotation as said control element, and means responsive to the speed of said control element to maintain the speed of said control element substantially constant.

7. In a speed control device, a differential device including two differential gear members, a rotatable pinion supporting member and a differential pinion journalled in said pinion supporting member and meshing with said gear members, a driving element rotating one of said members, a driven element rotated by another of said members, a rotatable worm gear rotated by another of said members, a worm supporting member journalled for rotation about the axis of said worm gear, a worm journalled in said worm supporting member and meshing with the teeth of said worm gear, said worm supporting member being rotated by one of said elements, a control element journalled for rotation about said axis, gearing between said worm and control element for rotating said worm relative to said worm gear upon relative rotation between said worm supporting member and said control element whereby varying the speed of rotation of said control element varies the speed of said driven element relative to said driving element, said gearing having a gear ratio correlated with the gear ratios of said differential device and of said worm and worm gear to cause said driven element to have the same speed of rotation as said control element, and means responsive to the speed of said driving element to connect said control element to said driven element to rotate at the same speed as said driven element when the speed of said driving element is below a predetermined speed and to cause said control element to rotate at the same speed as said driving element when the speed of said driving element is above said predetermined speed.

8. In a speed control device, a differential device including two differential gear members, a rotatable pinion supporting member and a differential pinion journalled in said pinion supporting member and meshing with said gear members, a driving element rotating one of said members, a driven element rotated by another of said members, a rotatable worm gear rotated by another of said members, a worm supporting member journalled for rotation about the axis of said worm gear, a worm journalled in said worm supporting member and meshing with the